(12) United States Patent
Kohda

(10) Patent No.: US 7,452,006 B2
(45) Date of Patent: Nov. 18, 2008

(54) PIPE JOINT AND SOCKET FOR PIPE JOINT

(75) Inventor: Toru Kohda, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 12 days.

(21) Appl. No.: 10/551,629

(22) PCT Filed: Sep. 17, 2004

(86) PCT No.: PCT/JP2004/013688

§ 371 (c)(1),
(2), (4) Date: Sep. 30, 2005

(87) PCT Pub. No.: WO2005/028940

PCT Pub. Date: Mar. 31, 2005

(65) Prior Publication Data

US 2006/0284418 A1  Dec. 21, 2006

(30) Foreign Application Priority Data

Sep. 18, 2003  (JP) .............................. 2003-326887

(51) Int. Cl.
F16L 37/00 (2006.01)
F16L 15/00 (2006.01)
F16L 27/00 (2006.01)

(52) U.S. Cl. .......................... 285/316; 285/86; 285/91; 285/93; 285/276; 285/308

(58) Field of Classification Search ................ 285/316, 285/86, 91, 93, 308, 276
See application file for complete search history.

(56) References Cited

U.S. PATENT DOCUMENTS

| 2,708,589 | A | * | 5/1955 | Masek | .......................... 285/277 |
| 5,255,714 | A | * | 10/1993 | Mullins | .................. 137/614.04 |
| 5,323,812 | A | * | 6/1994 | Wayne | .................. 137/614.05 |
| 2003/0042734 | A1 | | 3/2003 | Kuwabara | |

FOREIGN PATENT DOCUMENTS

| EP | 0351439 A1 | * | 4/1990 |
| JP | S47-42013 | | 12/1972 |
| JP | S48-020669 Y1 | | 6/1973 |
| JP | S51-69119 | | 6/1975 |
| JP | S57-49030 | | 10/1982 |
| JP | S60-005181 Y2 | | 2/1985 |
| JP | H03-042305 | | 9/1991 |
| JP | P2000-266264 A | | 9/2000 |

OTHER PUBLICATIONS

Supplementary European Search Report dated Oct. 5, 2007 for European patent application No. EP 04 77 3307.

* cited by examiner

*Primary Examiner*—James M Hewitt
*Assistant Examiner*—Jay R Ripley
(74) *Attorney, Agent, or Firm*—Brinks Hofer Gilson & Lione

(57) ABSTRACT

A pipe coupling is disclosed which comprises a plug (14) and a socket (12). When the plug is inserted into the socket, the plug first urges sleeve actuators (28) radially outward to axially move a sleeve (22) and, thereafter, urges locking elements (20) radially outward to move the sleeve further. Eventually, the locking elements and sleeve actuators are fitted within a locking recess (14-2) of the plug to securely connect the plug and the socket.

6 Claims, 6 Drawing Sheets

PIPE JOINT AND SOCKET FOR PIPE JOINT

FIELD OF THE INVENTION

The present invention generally relates to pipe couplings comprised of sockets (or female coupling members) and plugs (or male coupling members) and more particularly, to a quick connect pipe coupling wherein coupling engagement is quickly achieved simply by pushing a plug into a socket.

BACKGROUND OF THE INVENTION

There have been proposed a wide variety of quick connect pipe couplings wherein a socket is provided with locking balls, and a plug has a locking recess. Upon insertion of the plug into the socket, the locking balls are received in the locking recess to prevent disconnection of the plug from the socket.

One such quick connect pipe coupling includes a socket provided with a plurality of locking elements and formed with a plug receiving bore. A retainer is slidably movable on the inner wall of the bore to prevent the entry of the locking elements into the bore. When a plug is inserted a given distance into the bore, the retainer is axially moved away from the locking elements to allow the locking balls to be received in a locking recess formed on the plug. A sleeve is movably disposed about the socket. When the locking elements are received in the locking recess, the sleeve is moved over the locking elements to lock the locking elements against removal from the locking recess and thus, prevent disconnection of the plug from the socket (see, for example Reference 1).

Another quick connect pipe coupling teaches the use of an annular member disposed radially outwardly, rather than inwardly, of a plurality of locking elements. The annular member is axially movable on a socket and has a ramp. When a plug is inserted into the socket, the coupling end of the plug radially outwardly urges the locking elements into engagement with the ramp of the annular member. As a result, the annular member is axially moved to allow radial outward movement of the locking elements. The locking elements are thereafter received in a locking recess formed on the plug so as to provide a connection between the plug and the socket (see, for example, Reference 2).

In such a quick connect pipe coupling, the sleeve and the socket may be provided with a slot and a pin, respectively so that the sleeve is free to move in an axial direction only when the pin and the slot are axially aligned with one another. This axial movement allows removal of a plug from the socket (see, for example, References 3 and 4).

Reference 1: Japanese utility model publication No. 57-49030
Reference 2: Japanese utility model publication No. 47-42013
Reference 3: Japanese utility model application publication No. 51-69119
Reference 4: Japanese utility model publication No. 3-42305

In the pipe coupling shown in Reference 2, the annular member is returned to its initial position under the action of a spring after the locking elements are received in the locking recess. With the annular member in its initial position, the ramp of the annular member is engaged with the locking elements to complete connection between the socket and the plug. If an undue pulling force is exerted on the plug, the inclined side wall of the locking recess urges the locking elements in a radially outward direction. This results in axial displacement of the annular member in the same manner as when the plug is inserted into the socket. Under the circumstances, the plug can undesirably be pulled out of the socket.

It is, therefore, an object of the present invention to provide a pipe coupling and a socket therefore, which can securely lock a plug against removal from a socket if a pulling force is exerted on the plug.

SUMMARY OF THE INVENTION

According to one aspect of the present invention, there is provided a socket adapted to receive to a mating plug to collectively form a pipe coupling.

The socket includes a cylindrical socket body having a first through aperture extending radially therethrough, a locking element radially movable within the first through aperture and moved between a first radial position wherein the locking element is engaged with a locking recess on the plug so as to inhibit disconnection of the plug from the socket and a second radial position wherein the locking element is radially outwardly displaced from the first radial position and disengaged from the locking recess to allow disconnection of the plug from the socket, a sleeve disposed around the socket body and having a locking surface adapted to hold the locking element against radial outward movement and prevent movement of the locking element from the first radial position to the second radial position and an unlocking surface adapted to allow movement of the locking element from the first radial position to the second radial position, the sleeve being axially movable between a locking position wherein the locking surface is positioned radially outwardly of the locking element and an unlocking position wherein the unlocking surface is positioned radially outwardly of the locking element, and a spring for biasing the sleeve toward the locking position.

The plug includes a coupling end directed toward the socket, and a cylindrical surface extending from the coupling end in a direction away from the socket. The locking recess is defined on the cylindrical surface. The coupling end of the plug is slidably engaged with the locking element located in the first radial position to cause radial outward movement of the locking element when the plug is inserted into the socket.

The socket body includes a second through aperture located axially closer to the plug than the first through aperture and extending radially therethrough and a sleeve actuator disposed in the second through aperture and movable between a radially inward position wherein the sleeve actuator is engaged with the coupling end of the plug upon insertion of the plug into the socket and a radially outward position wherein the sleeve actuator is located radially outwardly from the radially inward position.

The sleeve has an inclined surface inclined radially outwardly from the locking surface toward the unlocking surface. The inclined surface is engaged with the sleeve actuator when the sleeve is located in the locking position. Upon insertion of the plug into the socket, the coupling end of the plug is first engaged with the sleeve actuator so that the sleeve actuator is radially outwardly moved to thereby cause axial movement of the sleeve against the bias of the spring. The coupling end of the sleeve then comes into engagement with the locking element during advancement of the plug. At this time, the inclined surface of the sleeve is moved to a radially outward position relative to the locking element. As the plug is further inserted, the coupling end of the plug radially outwardly urges the locking element against the inclined surface of the sleeve. An axial force is then exerted on the inclined surface of the sleeve through the locking element. This results in further axial movement of the sleeve.

With this arrangement, the locking element is received in the locking recess upon full insertion of the plug into the socket. In this condition, the locking element is held against the locking surface rather than the inclined surface of the sleeve. As such, the plug can not be pulled out of the socket unless the sleeve is moved to the unlocking position against the action of the spring. This arrangement thus prevents accidental removal of the plug from the socket.

In one embodiment, the locking recess has a given axial length and includes axially opposite circumferential side walls. The sleeve actuator and the locking element are engaged with the side walls when the spring urges the sleeve in a direction opposite the direction in which the plug is inserted into the socket after the sleeve actuator and the locking element are moved into the locking recess upon insertion of the plug into the socket. This configuration prevents axial wobbling of the plug within the socket.

According to another aspect of the present invention, there is provided a socket adapted to receive a mating plug to collectively form a pipe coupling.

The socket includes a cylindrical socket body having a first through aperture extending radially therethrough, a locking element radially movable within the first through aperture and moved between a first radial position wherein the locking element is engaged with a locking recess on the plug so as to inhibit disconnection of the plug from the socket and a second radial position wherein the locking element is radially outwardly displaced from the first radial position and disengaged from the locking recess to allow disconnection of the plug from the socket, a first sleeve disposed around the socket body and having a locking surface adapted to hold the locking element against radial outward movement and prevent movement of the locking element from the first radial position to the second radial position and an unlocking surface adapted to allow movement of the locking element from the first radial position to the second radial position, the first sleeve being axially movable between a locking position wherein the locking surface is positioned radially outwardly of the locking element and an unlocking position wherein the unlocking surface is positioned radially outwardly of the locking element, and a first spring for biasing the first sleeve toward the locking position.

The plug includes a coupling end directed toward the socket, and a cylindrical surface extending from the coupling end in a direction away from the socket. The locking recess is defined on the cylindrical surface. The coupling end of the plug is slidably engaged with the locking element located in the first radial position to cause radial outward movement of the locking element when the plug is inserted into the socket.

The socket body includes a second through aperture located axially closer to the plug than the first through aperture and extending radially therethrough and a sleeve actuator disposed in the second through aperture and movable between a radially inward position wherein the sleeve actuator is engaged with the coupling end of the plug upon insertion of the plug into the socket and a radially outward position wherein the sleeve actuator is located radially outwardly from the radially inward position.

The first sleeve has an inclined surface inclined radially outwardly from the locking surface toward the unlocking surface. The inclined surface is engaged with the sleeve actuator when the first sleeve is located in the locking position. The coupling end of the plug is first engaged with the sleeve actuator upon insertion of the plug into the socket so that the sleeve actuator is radially outwardly moved to thereby cause axial movement of the first sleeve against the bias of the spring. The coupling end of the sleeve then comes into engagement with the locking element during advancement of the plug. At this time, the inclined surface of the sleeve is moved to a radially outward position relative to the locking element. As the plug is further inserted, the coupling end of the plug radially outwardly urges the locking element against the inclined surface of the sleeve. An axial force is then exerted on the inclined surface of the sleeve through the locking element. This results in further axial movement of the sleeve.

The socket further includes a second sleeve disposed around the first sleeve and movable between a first axial position and a second axial position, allowing axial movement of the first sleeve upon insertion of the plug when the second sleeve is placed in the first axial position, allowing the first sleeve to be moved from the locking position to the unlocking position against the bias of the first spring when the second sleeve is moved from the first axial position to the second axial position, and rotatably moved on the socket between a first angular position and a second angular position, and a stopper arranged on the socket and engaged with the second sleeve to prevent axial movement of the second sleeve when the second sleeve is placed in the first angular position.

The second sleeve has a stopper receiving portion configured to prevent engagement of the stopper with the second sleeve and allow axial movement of the second sleeve when the sleeve is placed in the second angular position.

This socket is similar in operation to the socket as previously mentioned and thus offers the same advantageous effect. Also, the socket locks the plug from removal unless the second sleeve is moved to the second angular position.

In one embodiment, a second spring is provided to urge the second sleeve toward the first angular position.

More specifically, a coil spring is disposed around the socket body. The coil spring has one end located at a given angular position on the socket body and engaged with the first sleeve to serve as the first spring so as to urge the first sleeve toward the locking position, and the other end engaged with the second sleeve and adapted to serve as the second spring so as to urge the second sleeve toward the first angular position.

In one embodiment, the stopper receiving portion of the second sleeve is in the form of a slot extending from the second end toward the first end of the second sleeve. The stopper extends radially outwardly from the outer periphery of the socket. The stopper is engaged with the second end of the second sleeve when the second sleeve is located in the first angular position. The stopper is axially aligned with and inserted into the slot when the second sleeve is moved to the second angular position.

According to a further aspect of the present invention, there is provided a pipe coupling comprising a plug and a socket insertable into the plug for coupling engagement.

The socket includes a cylindrical socket body having a first through aperture extending radially therethrough, a locking element radially movable within the first through aperture and moved between a first radial position wherein the locking element is engaged with a locking recess on the plug so as to inhibit disconnection of the plug from the socket and a second radial position wherein the locking element is radially outwardly displaced from the first radial position and disengaged from the locking recess to allow disconnection of the plug from the socket, a sleeve disposed around the socket body and having a locking surface adapted to hold the locking element against radial outward movement and prevent movement of the locking element from the first radial position to the second radial position and an unlocking surface adapted to allow movement of the locking element from the first radial position to the second radial position, the sleeve being axially movable between a locking position wherein the locking surface is positioned radially outwardly of the locking element and an unlocking position wherein the unlocking surface is positioned radially outwardly of the locking element, and a spring for biasing the sleeve toward the locking position.

The plug includes a coupling end directed toward the socket, and a cylindrical surface extending from the coupling end in a direction away from the socket. The locking recess is defined on the cylindrical surface. The coupling end of the plug is slidably engaged with the locking element located in the first radial position to cause radial outward movement of the locking element when the plug is inserted into the socket.

The socket body includes a second through aperture located axially closer to the plug than the first through aperture and extending radially therethrough and a sleeve actuator disposed in the second through aperture and movable between a radially inward position wherein the sleeve actuator is engaged with the coupling end of the plug upon insertion of the plug into the socket and a radially outward position wherein the sleeve actuator is located radially outwardly from the radially inward position.

The sleeve has an inclined surface inclined radially outwardly from the locking surface toward the unlocking surface. The inclined surface is engaged with the sleeve actuator when the sleeve is located in the locking position. The coupling end of the plug is first engaged with the sleeve actuator upon insertion of the plug into the socket so that the sleeve actuator is radially outwardly moved to thereby cause axial movement of the sleeve against the bias of the spring. The coupling end of the sleeve then comes into engagement with the locking element during advancement of the plug. At this time, the inclined surface of the sleeve is moved to a radially outward position relative to the locking element. As the plug is further inserted, the coupling end of the plug radially outwardly urges the locking element against the inclined surface of the sleeve. An axial force is then exerted on the inclined surface of the sleeve through the locking element. This results in further axial movement of the sleeve.

According to a still further aspect of the present invention, there is provided a pipe coupling comprising a socket and a plug inserted into the socket for coupling engagement.

The socket includes a cylindrical socket body having a first through aperture extending radially therethrough, a locking element radially movable within the first through aperture and moved between a first radial position wherein the locking element is engaged with a locking recess on the plug so as to inhibit disconnection of the plug from the socket and a second radial position wherein the locking element is radially outwardly displaced from the first radial position and disengaged from the locking recess to allow disconnection of the plug from the socket, a first sleeve disposed around the socket body and having a locking surface adapted to hold the locking element against radial outward movement and prevent movement of the locking element from the first radial position to the second radial position and an unlocking surface adapted to allow movement of the locking element from the first radial position to the second radial position, the first sleeve being axially movable between a locking position wherein the locking surface is positioned radially outwardly of the locking element and an unlocking position wherein the unlocking surface is positioned radially outwardly of the locking element, and a first spring for biasing the first sleeve toward the locking position.

The plug includes a coupling end directed toward the socket, and a cylindrical surface extending from the coupling end in a direction away from the socket. The locking recess is defined on the cylindrical surface. The coupling end of the plug is slidably engaged with the locking element located in the first radial position to cause radial outward movement of the locking element when the plug is inserted into the socket.

The socket body includes a second through aperture located axially closer to the plug than the first through aperture and extending radially therethrough and a sleeve actuator disposed in the second through aperture and movable between a radially inward position wherein the sleeve actuator is engaged with the coupling end of the plug upon insertion of the plug into the socket and a radially outward position wherein the sleeve actuator is located radially outwardly from the radially inward position.

The first sleeve has an inclined surface inclined radially outwardly from the locking surface toward the unlocking surface. The inclined surface is engaged with the sleeve actuator when the first sleeve is located in the locking position. The coupling end of the plug is first engaged with the sleeve actuator upon insertion of the plug into the socket so that the sleeve actuator is radially outwardly moved to thereby cause axial movement of the first sleeve against the bias of the spring. The coupling end of the sleeve then comes into engagement with the locking element during advancement of the plug. At this time, the inclined surface of the sleeve is moved to a radially outward position relative to the locking element. As the plug is further inserted, the coupling end of the plug radially outwardly urges the locking element against the inclined surface of the sleeve. An axial force is then exerted on the inclined surface of the sleeve through the locking element. This results in further axial movement of the sleeve.

The pipe coupling further includes a second sleeve disposed around the first sleeve and movable between a first axial position and a second axial position, allowing axial movement of the first sleeve upon insertion of the plug when the second sleeve is placed in the first axial position, allowing the first sleeve to be moved from the locking position to the unlocking position against the bias of the first spring when the second sleeve is moved from the first axial position to the second axial position, and rotatably moved on the socket between a first angular position and a second angular position, and a stopper arranged on the socket and engaged with the second sleeve to prevent axial movement of the second sleeve when the second sleeve is placed in the first angular position.

The second sleeve has a stopper receiving portion configured to prevent engagement of the stopper with the second sleeve and allow axial movement of the second sleeve when the sleeve is placed in the second angular position.

Preferably, the spring is a coil spring disposed about the socket body. The coil spring has one end located at a given angular position on the socket body and engaged with the first sleeve to urge the first sleeve toward the locking position, and the other end engaged with the second sleeve to urge the second sleeve toward the first angular position.

Figure 1:
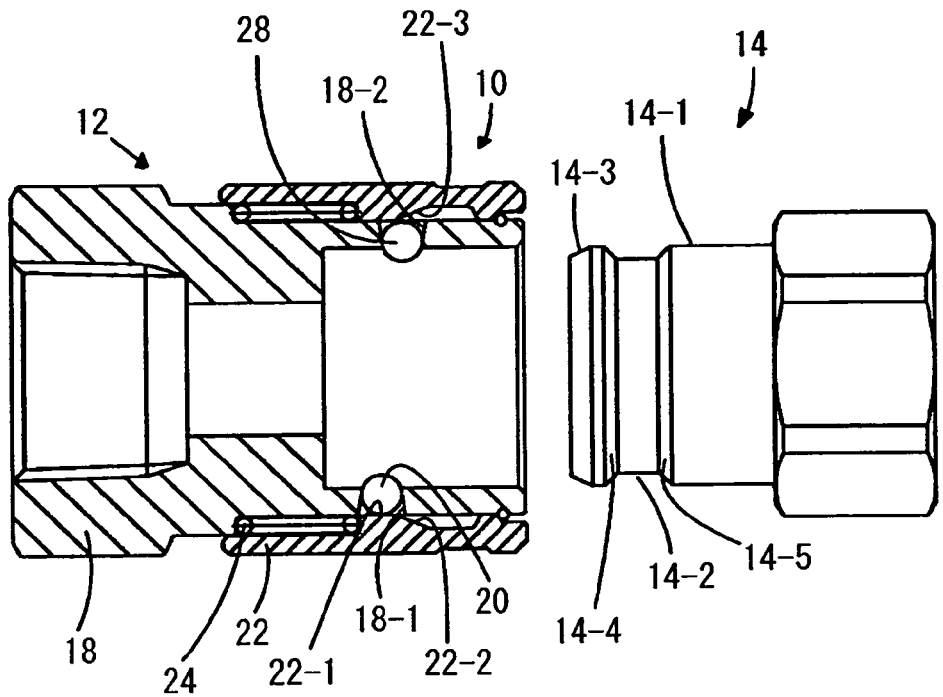
FIG. 1 is a side view, partially in section, of a pipe coupling according to a first embodiment, prior to insertion of a plug into a socket.
Figure 2:
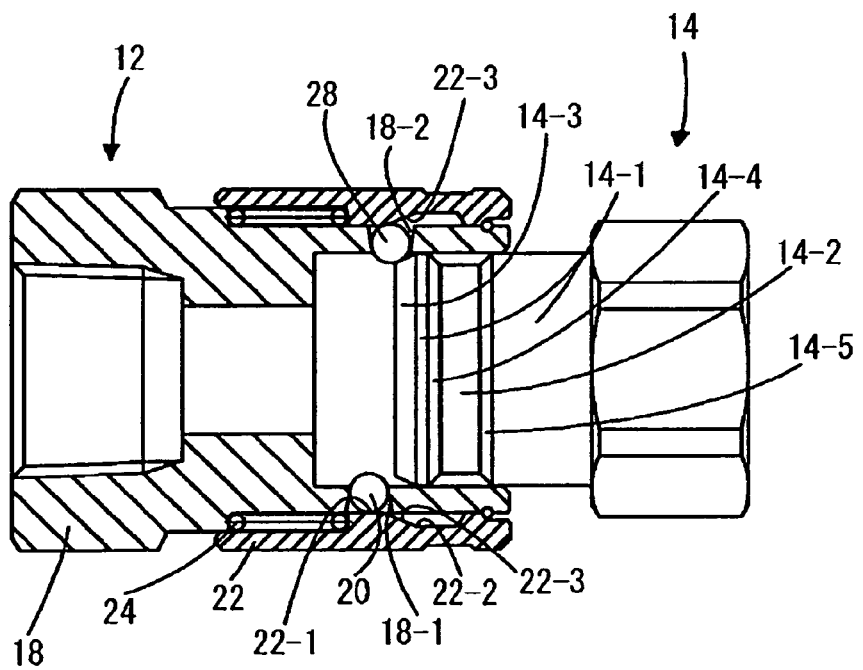
FIG. 2 is a side view, partially in section, of the pipe coupling, with a coupling end or tapered surface of the plug engaged with a plurality of sleeve actuators on insertion of the plug into the socket.
Figure 3:
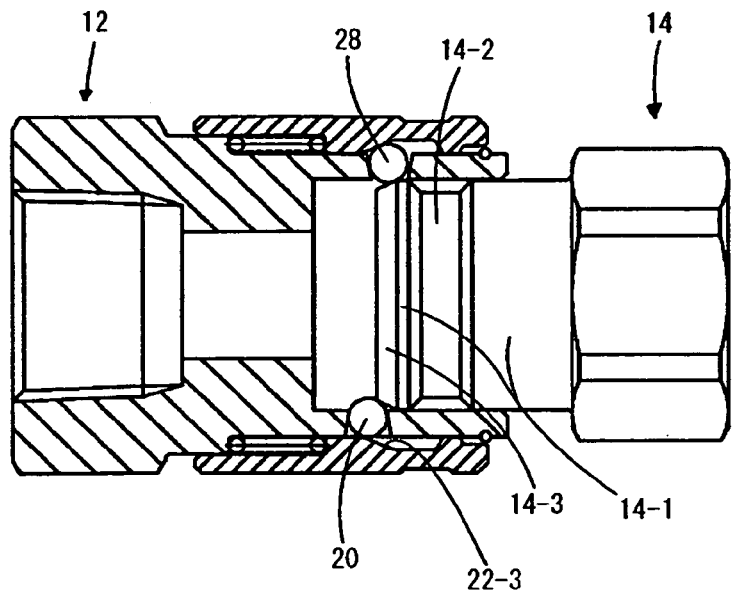
FIG. 3 is a side view, partially in section, of the pipe coupling, with the tapered surface of the plug engaged with a plurality of locking elements on further insertion of the plug into the socket.
Figure 4:
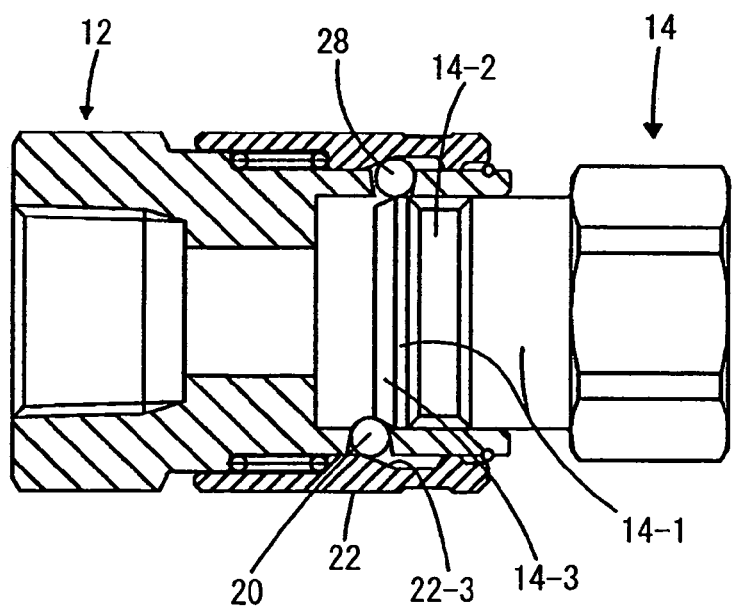
FIG. 4 is a side view, partially in section, of the pipe coupling, with the sleeve actuators placed in contact with a cylindrical surface of the plug.
Figure 5:
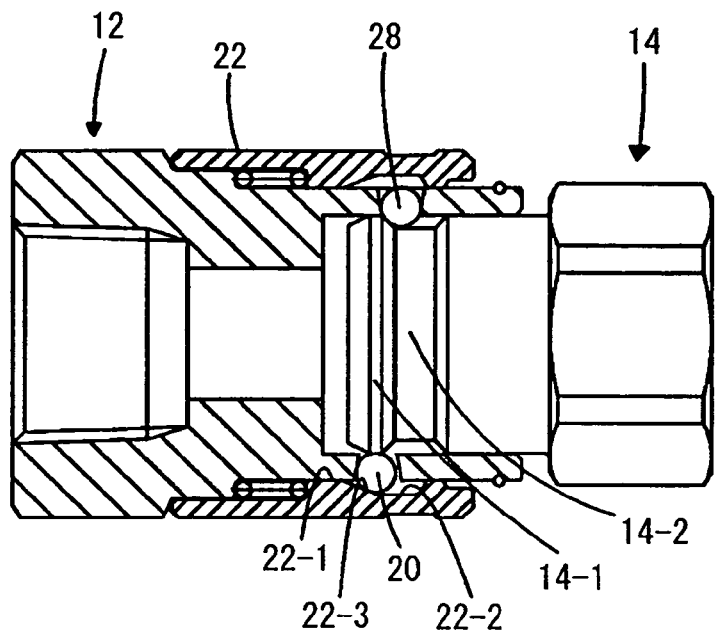
FIG. 5 is a side view, partially in section, of the pipe coupling, with the locking elements placed in contact with the cylindrical surface of the plug.

LIST OF REFERENCE NUMERALS 10 pipe coupling
12 socket
14 plug
14-1 cylindrical surface
14-2 locking recess
14-3 tapered surface
14-4 side wall of locking recess
14-5 side wall of locking recess
18 socket body
18-1 first through apertures
18-2 second through apertures
20 locking elements
22 sleeve
22-1 locking surface
22-2 unlocking surface
22-3 inclined surface
24 spring
28 sleeve actuators
110 pipe coupling
112 socket
114 plug
118 socket body
118-2 large diameter shoulder portion
118-3 small diameter shoulder portion
118-4 groove
120 locking elements
122 first sleeve
130 second sleeve
130-1 first end
130-2 second end
120-3 slot
134 coil spring
140 first pin
142 second pin

PREFERRED EMBODIMENTS

The present invention will now be described with reference to the accompanying drawings.

FIGS. 1 to 6 illustrate a pipe coupling made according to a first embodiment of the present invention.

As is conventional, a pipe coupling 10 includes a socket 12 and a mating plug 14 inserted into the socket 12 for coupling engagement.

The socket 12 includes a socket body 18 having a plurality of circumferentially spaced through apertures 18-1 (only one is shown) extending radially through the socket body 18, a plurality of locking elements radially movable within the respective through apertures 18-1, a sleeve 22 disposed around the socket body 18, and a spring 24 for urging the sleeve 22.

The plug 14 has a cylindrical surface 14-1 and an annular locking recess 14-2 formed on the cylindrical surface 14-1. The locking elements 20 are movable between a first radial position wherein the locking elements 20 are engaged with the locking recess to prevent disconnection of the plug 14 from the socket 12 (see FIGS. 1, 2 and 6) and a second radial position wherein the locking elements 20 are disengaged from the locking recess to allow removal of the plug 14 from the socket 12 (see FIG. 4).

The sleeve 22 has a locking surface 22-1 and an unlocking surface 22-2. The locking surface 22-1 prevents the locking elements 20 from being radially outwardly moved from the first radial position (see FIGS. 1, 2 and 6) toward the second radial position (see FIG. 4). The unlocking surface 22-2 allows the locking elements 20 to be radially outwardly moved into contact with the cylindrical surface 14-1. The sleeve 22 is axially movable between a locking position wherein the locking surface 22-1 is located radially outwardly of the locking elements 20 (see FIGS. 1, 2 and 6) and an unlocking position wherein the unlocking surface 22-2 is located radially outwardly of the locking elements 20 (see FIG. 4). The spring 24 urges the sleeve 22 toward the locking position (see FIG. 6).

The plug 14 has a tapered surface 14-3 shaped to diverge 14-3 rearwardly and gradually from the front, coupling end of the plug 14. The cylindrical surface 14-1 is connected to the rear end of the tapered surface 14-3. The cylindrical surface 14-1 has a diameter greater than that of the coupling end of the plug 14 and substantially equal to the inner diameter of the socket body. The locking recess 14-2 is defined in the cylindrical surface 14-1. With the locking elements 20 in its first radial position, the inclined surface 14-3 is brought into engagement with the locking elements 20 when the plug 14-is inserted into the socket 12. Further insertion of the plug 14 causes radial outward movement of the locking elements 20.

The socket body 18 includes a plurality of second through apertures 18-2 (only one is shown) and a plurality of sleeve actuators 28 disposed in the respective second through apertures 18-2. The second through apertures 18-2 extend radially through the socket body 18 and are located axially outwardly from (or disposed closer to the coupling end of the plug 14 than) the first through apertures 18-1. The second through apertures 18-2 are arranged in a circumferentially spaced relationship. Preferably, the second through apertures 18-2 and the first through apertures 18-1 are arranged in a circumferentially alternate fashion. The sleeve actuators 28 are movable between a radially inward position wherein the sleeve actuators 28 are engaged with the tapered surface 14-3 upon insertion of the plug 14 into the socket 12 (see FIGS. 1 and 2) and a radially outward position wherein the sleeve actuators 28 are moved radially outwardly from the radially inward position and contacted with the cylindrical surface 14-1 of the plug 14. The sleeve 22 has an inclined surface 22-3 inclined radially outwardly from the locking surface 22-1 to the unlocking surface 22-2. When the plug 14 is inserted into the socket 12, the tapered surface 14-3 of the plug 14 is brought into engagement with the sleeve actuators 28. Further insertion of the plug 14 urges the sleeve actuators 28 to be radially outwardly moved into engagement with the inclined surface 22-3. As a result, an axial force is applied to the sleeve 22 through the inclined surface 22-3 so that the sleeve 22 is axially moved against the bias of the spring 24. Continued insertion of the plug 14 causes the tapered surface 14-3 to be engaged with the locking elements 20. While the locking elements 20 are radially outwardly moved, an axial force is applied to the sleeve 22 through the inclined surface 22-3 to cause further axial movement of the sleeve 22.

Figure 6:
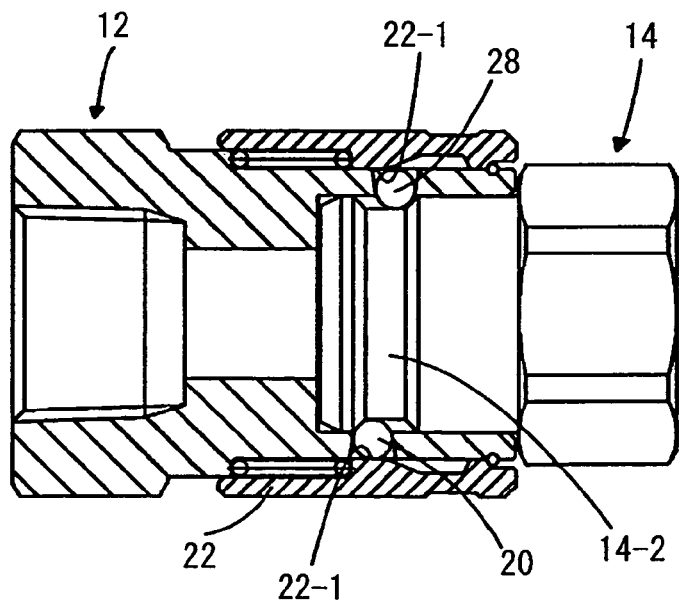
FIG. 6 is a side view, partially in section, of the pipe coupling, with a sleeve returned to its initial position so that the locking elements are held against a locking surface to prevent removal of the plug from the socket.

The locking recess 14-2 has a sufficient axial length. The locking recess 14-2 has axially opposite circumferential side walls 14-4, 14-5. Upon insertion of the plug 14, the sleeve actuators 28 and the locking elements 20 are received in the locking recess 14-2. The spring 24 then urges the sleeve 22 in a direction opposite the direction in which the plug 14 is inserted. With the locking elements 20 and the sleeve actuators 28 held in contact with the locking surface 22-1 of the sleeve 22, the locking elements 20 and the sleeve actuators are engaged with the side walls 14-4, 14-5 of the locking recess 14-2 (FIG. 6).

When the locking elements 20 are received in the locking recess 14-2 of the plug 14, the spring 24 causes the sleeve 22 to be returned to its locking position. With the sleeve 22 in its locking position, the locking surface 22-1 is held in engagement with the locking elements 20. This configuration prevents removal of the plug 14 from the socket 12 if a pulling force is exerted on the plug 14. To pull the plug 14 out of the socket 12, the user must axially move the sleeve 22 to its unlocking position against the bias of the spring 24. With the sleeve in its unlocking position, the unlocking surface 22-2 is positioned radially outwardly of the locking elements 20.

FIGS. 7 to 12 illustrate a pipe coupling 110 made according to a second embodiment of the present invention.

As shown, the pipe coupling 110 generally includes a socket 112 and a mating plug 114 insertable into the socket 112 for coupling engagement, as in the first embodiment. The socket 112 has a socket body 118 through which a plurality of first through apertures 118-1 are defined, a plurality of locking elements 120 radially movable in the first through apertures 118-1, and a first sleeve 122 extending around the socket body 118. The socket body 118, the locking elements 120 and the sleeve 122 correspond in structure and function to the socket 18, the locking elements 20 and the sleeve 22 used in the first embodiment, respectively. Similarly, the plug 114 corresponds to the plug 14 of the first embodiment.

Figure 7:
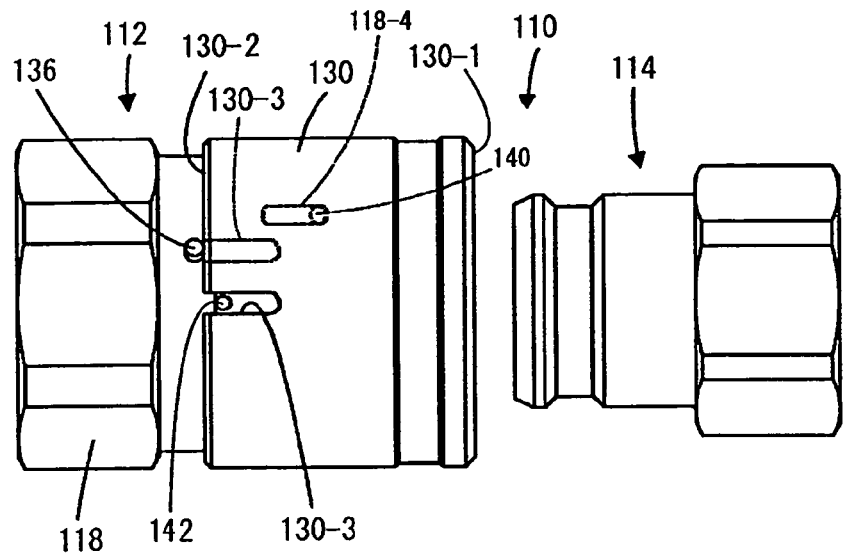
FIG. 7 is a plan view of a pipe coupling according to a second embodiment of the present invention, prior to insertion of a plug into a socket.
Figure 8:
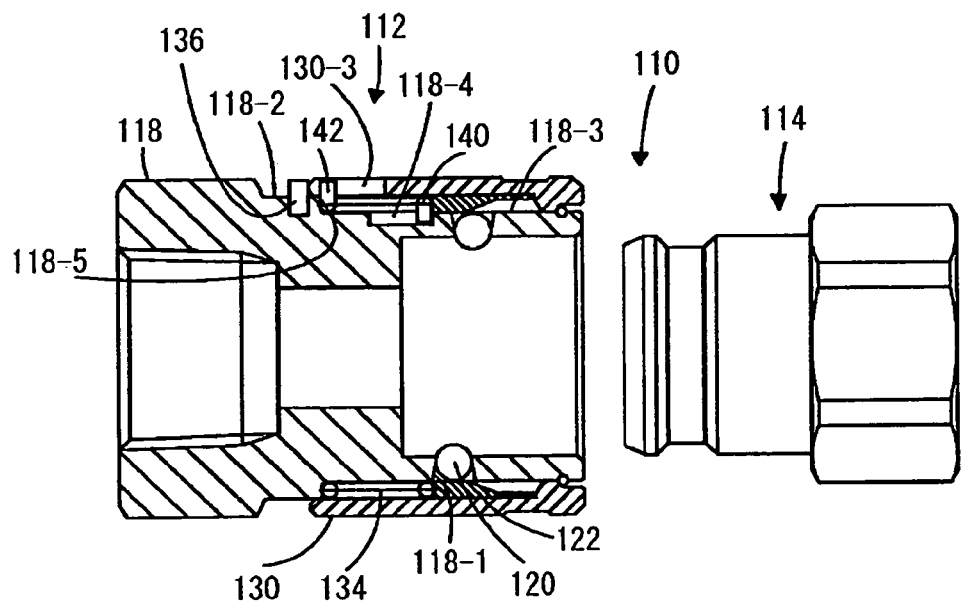
FIG. 8 is a side view, partially in section, of the pipe coupling shown in FIG. 7.
Figure 9:
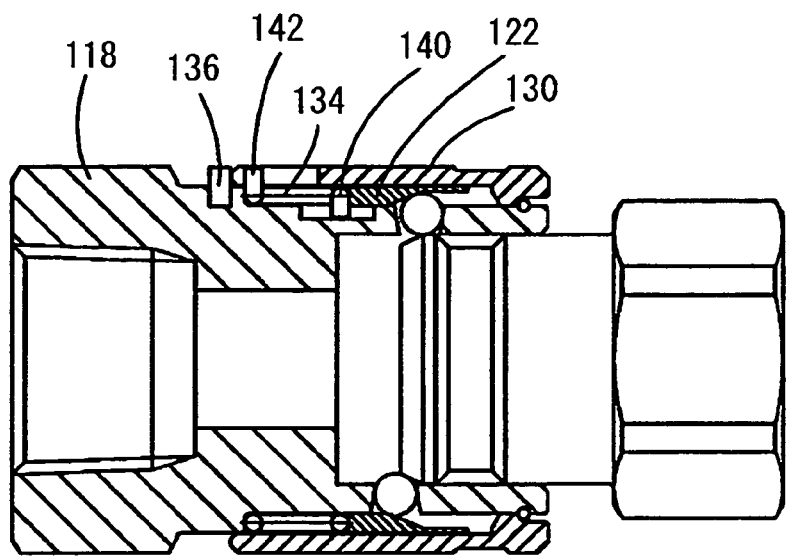
FIG. 9 is a side view, partially in section, of the pipe coupling, showing the manner in which a coupling end or tapered surface of the plug is engaged with a plurality of locking elements, and a plurality of sleeve actuators are radially outwardly displaced and engaged with a cylindrical surface of the plug.
Figure 10:
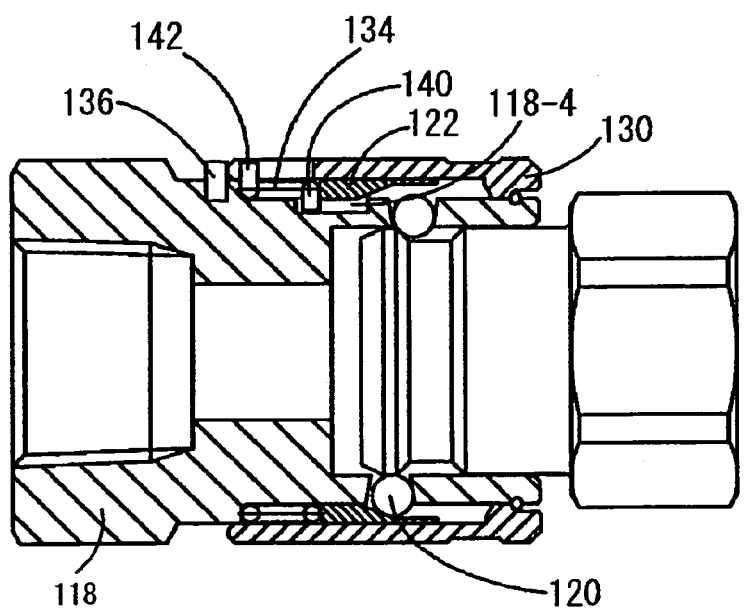
FIG. 10 is a side view, partially in section, of the pipe coupling, with the locking elements placed in contact with the cylindrical surface of the plug.
Figure 11:
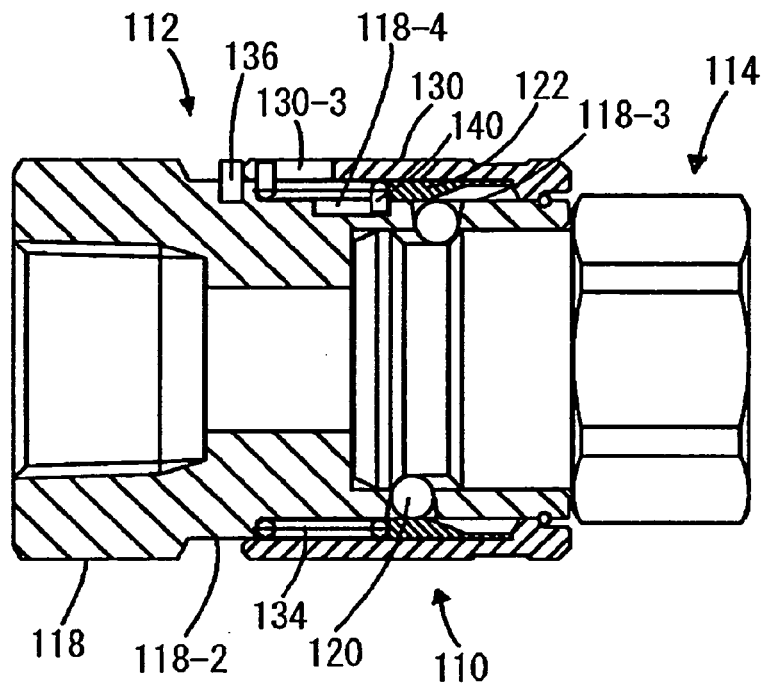
FIG. 11 is a side view, partially in section, of the pipe coupling, showing the manner in which a first sleeve is returned to its initial position so as to apply a radial inward force to the locking elements.
Figure 12:
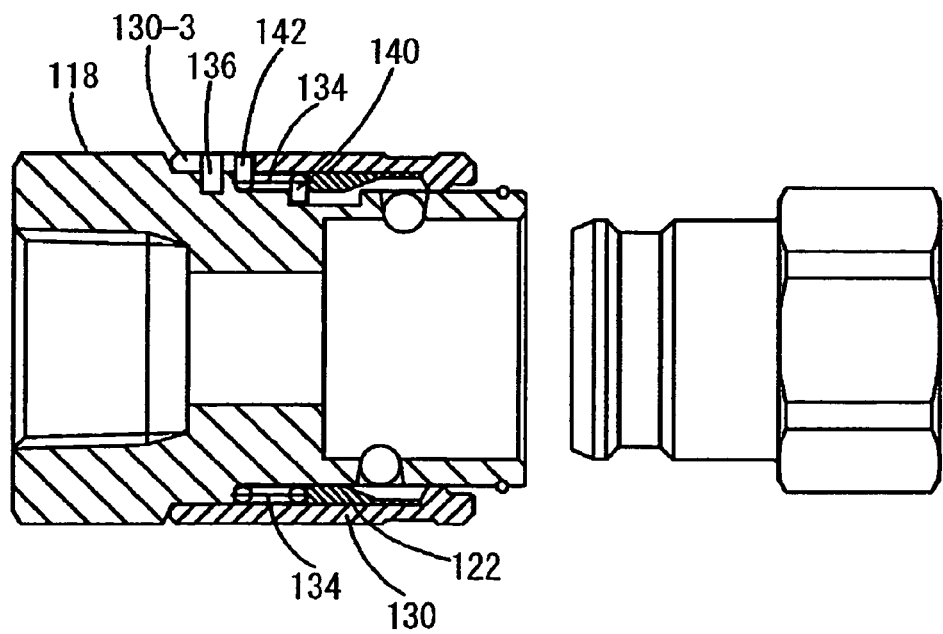
FIG. 12 is a side view, partially in section, of the pipe coupling, showing the manner in which a second sleeve is moved away from the plug and toward its second angular position to allow radial outward movement of the locking elements and the sleeve actuators.

In the second embodiment, the pipe coupling 110 further includes a second sleeve 130 disposed around the first sleeve 122. The second sleeve 130 is movable between a first axial position (see FIGS. 7 to 11) and a second axial position (see FIG. 12). The second sleeve 130, when held in its first axial position, allows axial movement of the first sleeve 122 when the plug 114 is inserted into the socket 112. The second sleeve 130, when moved from its first to second axial position, allows the first sleeve 122 to be moved from its locking to unlocking position. The second sleeve 130 is also rotatably moved between a first angular position wherein no torque is exerted on the second sleeve 130, as shown in FIG. 7 and a second angular position wherein a slot 130-3, which will later be described, is moved to a position shown by imaginary line in FIG. 7.

A coil spring 134 is disposed about the socket body 118. The coil spring 134 has one end engaged with the first sleeve 122 to urge the first sleeve 122 toward its locking position. The other end of the coil spring 134 is engaged with the second sleeve 130 to urge the second sleeve 130 toward its first angular position.

The second sleeve 130 has a first end 130-1 located adjacent to the plug 114 and a second end 130-2 located remote from the plug 114. The slot 130-3 is defined in the second sleeve 130 and axially extends from the second end 130-2 toward the first end 130-1. A radial pin 136 extends outwardly from the outer periphery of the socket body 118. With the second sleeve 130 held in its first angular position, the pin 136 is engaged with the second end 130-2 of the second sleeve 130 to prevent the second sleeve 130 from being moved from its first axial position (see FIG. 7) to its second axial position (see FIG. 12). When the second sleeve 130 is moved to its second angular position, the pin 136 is axially aligned with the slot 130-3 to thereby allow the second sleeve 130 to be moved to its second axial position.

In the illustrated embodiment, the socket body 118 includes a large diameter shoulder portion 118-2 and a small diameter shoulder portion 118-3. A groove 118-4 is defined in the small diameter shoulder portion 118-3 and has a given axial length. A first pin 140 is arranged in the groove 118-4, and a second pin 142 is arranged in the slot 130-3.

The coil spring 134 extends around the small diameter shoulder portion 118-3 and has opposite ends connected to the first and second pins, respectively. The coil spring 134 biases the first sleeve toward its locking position (to the right in the drawings) through the first pin 140. As the first sleeve 122 is engaged with the second sleeve 130, the second sleeve is also urged toward its first axial position. Also, the second pin 142 is urged against an end wall 118-5 of the small diameter shoulder portion 118-3. With this arrangement, the second sleeve 130 is held in its first axial and angular position, as shown in FIG. 7, when no force is applied thereto.

The invention claimed is:

1. A socket for use in a pipe coupling having a mating plug, the mating plug insertable into said socket for coupling engagement, said socket including:
   a cylindrical socket body having a first through aperture extending radially therethrough;
   a locking element radially movable within said first through aperture, said locking element being movable between a first radial position wherein said locking element is engaged with a locking recess on said plug so as to inhibit disconnection of said plug from said socket and a second radial position wherein said locking element is radially outwardly displaced from said first radial position and disengaged from said locking recess to allow disconnection of said plug from said socket;
   a first sleeve disposed around said socket body and having a locking surface adapted to hold said locking element against radial outward movement and prevent movement of said locking element from said first radial position to said second radial position and an unlocking surface adapted to allow movement of said locking element from said first radial position to said second radial position, said first sleeve being axially movable between a locking position wherein said locking surface is positioned radially outwardly of said locking element and an unlocking position wherein said unlocking surface is positioned radially outwardly of said locking element; and a spring for biasing said first sleeve toward said locking position, said plug including:

a coupling end directed toward said socket; and a cylindrical surface extending from said coupling end in a direction away from said socket, said locking recess being defined on said cylindrical surface, said coupling end of said plug being slidably engaged with said locking element located in said first radial position to cause radial outward movement of said locking element when said plug is inserted into said socket, said socket characterized in that:

said socket body comprises a second through aperture located axially closer to said plug than said first through aperture and extending radially therethrough and a sleeve actuator disposed in said second through aperture and movable between a radially inward position wherein said sleeve actuator is engaged with said coupling end of said plug upon insertion of said plug into said socket and a radially outward position wherein said sleeve actuator is located radially outwardly from said radially inward position; and said first sleeve has an inclined surface inclined radially outwardly from said locking surface toward said unlocking surface, said inclined surface being engaged with said sleeve actuator when said first sleeve is located in said locking position, said coupling end of said plug being engaged with said sleeve actuator upon insertion of said plug into the socket so that said sleeve actuator is radially outwardly moved to thereby cause axial movement of said first sleeve against the bias of said spring and, thus, when said coupling end of said plug is brought into engagement with said locking element during advancement of said plug, said inclined surface is positioned at a radially outward position relative to said locking element, said coupling end of said plug radially outwardly urging said locking element against said inclined surface of said sleeve upon further insertion of said plug, thereby causing further axial movement of said sleeve, said socket further comprising:

a second sleeve disposed around said first sleeve and movable between a first axial position and a second axial position, said second sleeve allowing axial movement of said first sleeve upon insertion of said plug when said second sleeve is placed in said first axial position, said second sleeve moving said first sleeve from said locking position to said unlocking position against the bias of said spring when said second sleeve is moved from said first axial position to said second axial position, said second sleeve being rotatably moved on said socket between a first angular position and a second angular position, said second sleeve in operation movable independently in relation to said first sleeve; and a stopper arranged on said socket, said stopper being engaged with said second sleeve to prevent axial movement of said second sleeve when said second sleeve is placed in said first angular position, said second sleeve having a stopper receiving portion configured to prevent engagement of said stopper with said second sleeve and allow axial movement of said second sleeve when said sleeve is placed in said second angular position.

2. A socket according to claim 1, said spring further comprising a coil spring disposed around said socket body, said coil spring having one end located at a given angular position on said socket body and engaged with said first sleeve to urge said first sleeve toward said locking position, and an other end engaged with said second sleeve to urge said second sleeve toward said first angular position.

3. A socket according to any one of claims 1-2, wherein said second sleeve has a first end adjacent to said plug and a second end remote from said plug, wherein said stopper receiving portion includes a slot extending from said second end toward said first end of said second sleeve, and wherein said stopper extends radially outwardly from said socket, said stopper being engaged with said second end of said second sleeve when said second sleeve is located in said first angular position, said stopper being axially aligned with said slot to allow said second sleeve to be moved to said second axial position when said second sleeve is placed in said second angular position.

4. A socket according to claim 2, wherein said second sleeve has a first end adjacent to said plug and a second end remote from said plug, wherein said stopper receiving portion includes a slot extending from said second end toward said first end of said second sleeve, and wherein said stopper extends radially outwardly from said socket, said stopper being engaged with said second end of said second sleeve when said second sleeve is located in said first angular position, said stopper being axially aligned with said slot to allow said second sleeve to be moved to said second axial position when said second sleeve is placed in said second angular position.

5. A pipe coupling comprising a socket and a mating plug insertable into said socket for coupling engagement, said socket including:

a cylindrical socket body having a first through aperture extending radially therethrough;

a locking element radially movable within said first through aperture, said locking element being movable between a first radial position wherein said locking element is engaged with a locking recess on said plug so as to inhibit disconnection of said plug from said socket and a second radial position wherein said locking element is radially outwardly displaced from said first radial position and disengaged from said locking recess to allow disconnection of said plug from said socket;

a first sleeve disposed around said socket body and having a locking surface adapted to hold said locking element against radial outward movement and prevent movement of said locking element from said first radial position to said second radial position and an unlocking surface adapted to allow movement of said locking element from said first radial position to said second radial position, said first sleeve being axially movable between a locking position wherein said locking surface is positioned radially outwardly of said locking element and an unlocking position wherein said unlocking surface is positioned radially outwardly of said locking element; and a spring for biasing said first sleeve toward said locking position, said plug including:
  a coupling end directed toward said socket; and
  a cylindrical surface extending from said coupling end in a direction away from said socket, said locking recess being defined on said cylindrical surface,
  said coupling end of said plug being slidably engaged with said locking element located in said first radial position to cause radial outward movement of said locking element when said plug is inserted into said socket, said socket body comprising:
  a second through aperture located axially closer to said plug than said first through aperture and extending radially therethrough and a sleeve actuator disposed in said second through aperture and movable between a radially inward position wherein said sleeve actuator is engaged with said coupling end of said plug upon insertion of said plug into said socket and a radially outward position wherein said sleeve actuator is located radially outwardly from said radially inward position; and
  said first sleeve has an inclined surface inclined radially outwardly from said locking surface toward said unlocking surface, said inclined surface being engaged with said sleeve actuator when said first sleeve is located in said locking position, said coupling end of said plug being engaged with said sleeve actuator upon insertion of said plug into the socket so that said sleeve actuator is radially outwardly moved to thereby cause axial movement of said first sleeve against the bias of said spring and, thus, when said coupling end of said plug is brought into engagement with said locking element during advancement of said plug, said inclined surface is positioned at a radially outward position relative to said locking element, said coupling end of said plug radially outwardly urging said locking element against said inclined surface of said sleeve upon further insertion of said plug, thereby causing further axial movement of said sleeve, said pipe coupling further comprising:
  a second sleeve disposed around said first sleeve and movable between a first axial position and a second axial position, said second sleeve allowing axial movement of said first sleeve upon insertion of said plug when said second sleeve is placed in said first axial position, said second sleeve allowing said first sleeve to be moved from said locking position to said unlocking position against the bias of said spring when said second sleeve is moved from said first axial position to said second axial position, said second sleeve being rotatably moved on said socket between a first angular position and a second angular position, said second sleeve in operation movable independently in relation to said first sleeve; and
  a stopper arranged on said socket, said stopper being engaged with said second sleeve to prevent axial movement of said second sleeve when said second sleeve is placed in said first angular position,
  said second sleeve having a stopper receiving portion configured to prevent engagement of said stopper with said second sleeve and allow axial movement of said second sleeve when said sleeve is placed in said second angular position.

6. A pipe coupling according to claim 5, wherein said spring is a coil spring disposed about said socket body, said coil spring having one end located at a given angular position on said socket body and engaged with said first sleeve to urge said first sleeve toward said locking position, and an other end engaged with said second sleeve to urge said second sleeve toward said first angular position.

* * * * *